P. OLSON

AUTOMATIC SAFETY CONTROL FOR CONVEYERS

Nov. 24, 1931.

Original Filed Jan. 2, 1926

Re. 18,262

2 Sheets-Sheet 1

Witness.
H. C. McKnight.

Inventor.
Peter Olson.
by Burton & Burton
his Attorneys.

P. OLSON
AUTOMATIC SAFETY CONTROL FOR CONVEYERS
Nov. 24, 1931.
Original Filed Jan. 2, 1926
Re. 18,262
2 Sheets-Sheet 2
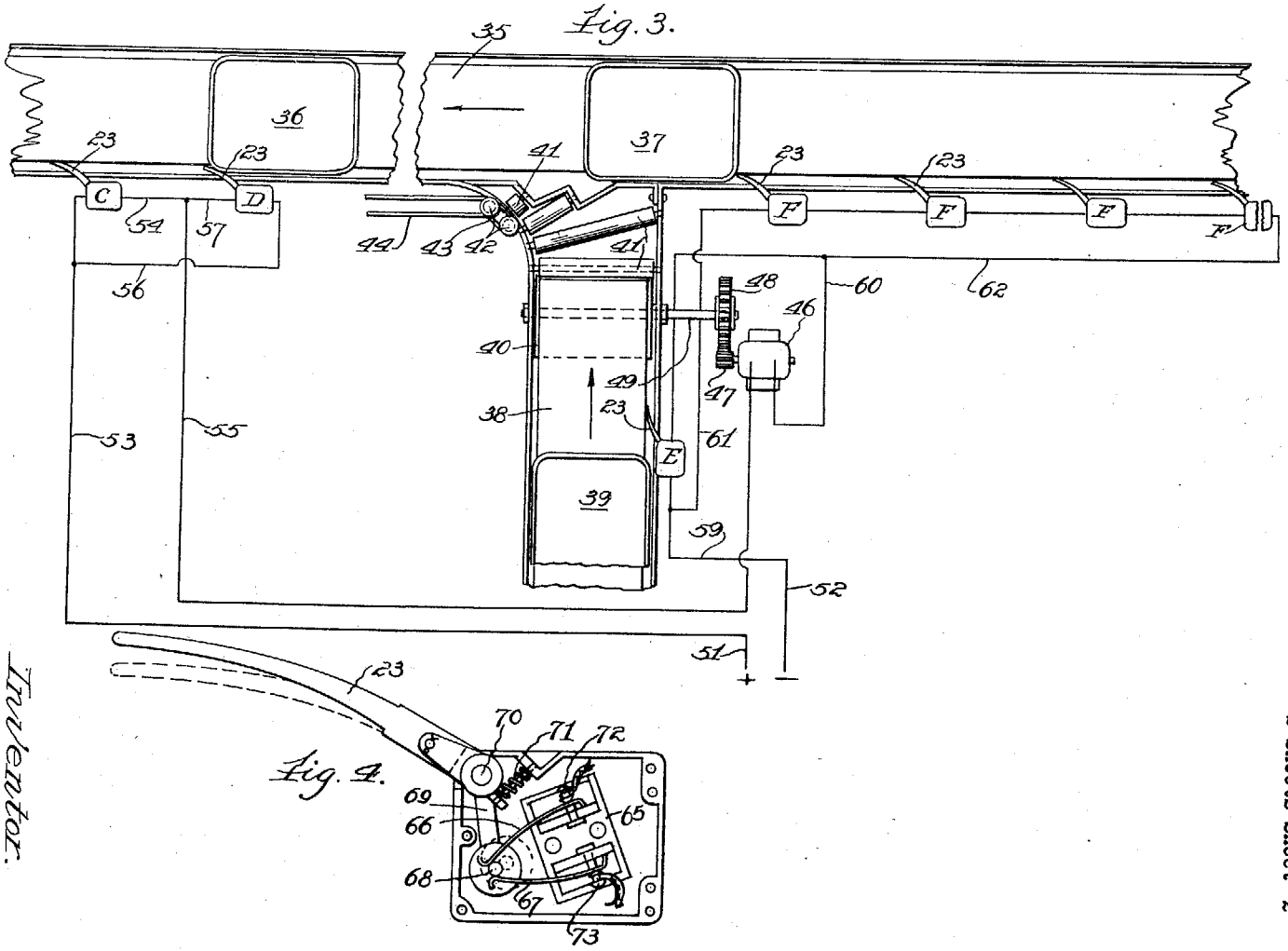
Witness
H. C. McKnight.
Inventor.
Peter Olson
by Burton & Burton
his Attorneys.

Reissued Nov. 24, 1931 Re. 18,262

UNITED STATES PATENT OFFICE

PETER OLSON, OF OAK PARK, ILLINOIS, ASSIGNOR TO SAMUEL OLSON & COMPANY, INC., OF CHICAGO, ILLINOIS, A CORPORATION OF ILLINOIS

AUTOMATIC SAFETY CONTROL FOR CONVEYERS

Continuation of original application Serial No. 78,851, filed January 2, 1926. Patent No. 1,763,812, dated June 17, 1930. Application filed January 7, 1928, Serial No. 245,095. Application for reissue filed September 11, 1930. Serial No. 481,321.

This invention relates to conveyer systems and has for a principal object to provide automatic means for controlling the operation of a conveyer system to avoid collisions. It consists in certain features and elements, in combination, as herein shown and described and as indicated by the claims.

In the drawings:

Figure 3 is a somewhat diagrammatic plan view, showing two co-operating horizontal conveyers with my safety control applied thereto.

Figure 4 is an enlarged detail view illustrating the interior construction of the limit switch employed in this invention.

This is a continuation of my co-pending application, filed January 2, 1926, Serial No. 78,851.

The principle of automatic safety control embodied in the present invention is adaptable to a relatively wide variety of conveyer systems and it is to be understood that the term "conveyer" as used herein is intended to apply to any form of supporting and guiding surface over which or by which loads are normally caused to move in a confined path, whether propelled by power means, or otherwise, as, for example, by gravity. The construction shown in Figs. 1 and 2 comprises a vertically traveling conveyer or elevator co-operating with a horizontal conveyer; Fig. 3 illustrates a system in which two substantially horizontal conveyers cooperate in the transfer of loads from one to the other. In the arrangement shown in Figs. 1 and 2 it will be understood that the elevator travels in a downward direction (as indicated by the arrow) for depositing loads onto a horizontal receiving conveyer, which travels in a direction away from the elevator (as shown by the arrow) so that the load units are normally moved from the point of deposit as soon as they are delivered onto the receiving conveyer. This control system is equally applicable to conveying systems in which the elevator travels in an upward direction to discharge loads onto a horizontal conveyer, as illustrated in Reissue Patent No. 17,517, granted to Samuel Olson and dated December 10, 1929. The elevator or downwardly travelling conveyer consists of two pairs of endless chain belts, 10, each pair being connected by suitably spaced, transversely extending angle shaped flights, 11, whose horizontal arms extend toward each other to provide a supporting shelf for carrying loads, herein indicated as trays, 12, in a substantially horizontal position.

Figure 1:
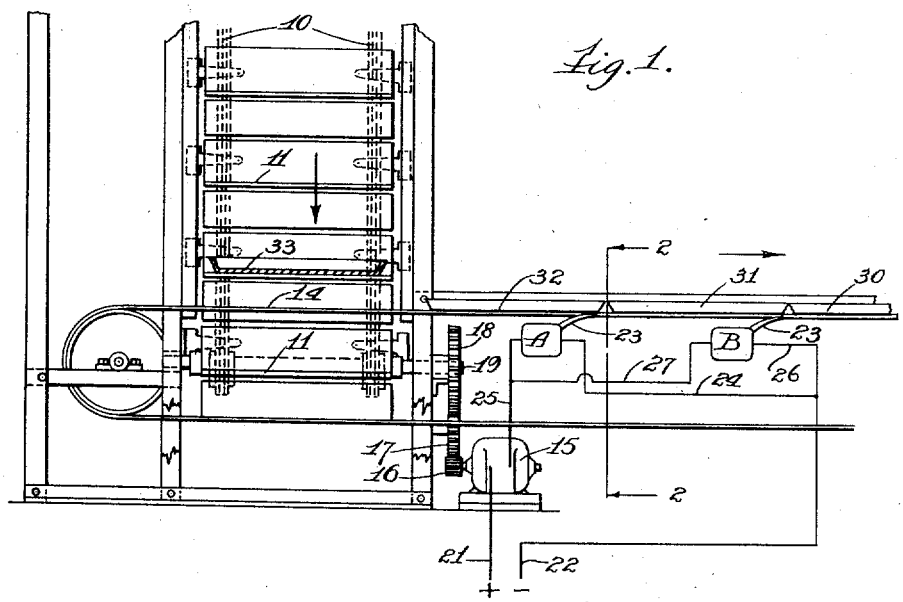
Figure 1 is a fragmentary vertical sectional view of a vertical conveyer, illustrating somewhat diagrammatically a side elevation of a horizontal conveyer co-operating therewith and to which my safety control system is applied.

As may be seen in Figure 1, the horizontal conveyer passes between the pairs of endless belts adjacent the lower end of the elevator. This horizontal conveyer may be of any of the usual flat top types, being herein shown as a conveyer belt, 14, positioned so that the flights, 11, on said belts, 10, pass on opposite sides thereof and permit the belt, 14, to receive the loads therefrom. The belt 14, may be driven from the elevator, but is preferably driven independently. An electric motor, 15, is provided with a pinion, 16, meshed with an idler gear, 17, which drives a gear, 18, on a shaft 19, for propelling the chain belts, 10. The current is supplied to the motor by conductors, 21 and 22; conductor 21 is connected directly to the motor, but conductor, 22, is connected to include two paths for the current to the motor, controlled by limit switches, A and B. These switches may be identical in construction and each of them is provided with a laterally movable arm, 23, positioned so as to normally extend slightly above the plane of the belt, 14, for engagement by the overhanging portion of the trays. The switches A and B are normally closed when not engaged by a tray and are spaced apart slightly more than the length of a tray so that a single tray will not operate both switches at the same time.

Figure 2:
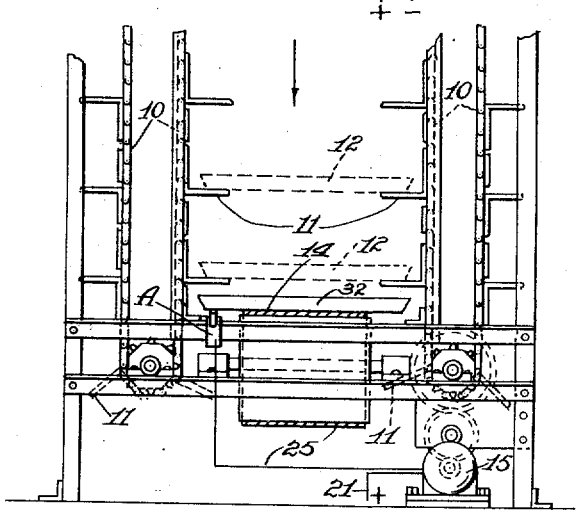
Figure 2 is a vertical section through the horizontal conveyer, taken as indicated at line, 2—2, on Figure 1.

One path for the current from conductor 22 comprises a conductor, 24, to switch, A, and conductor, 25, to the motor 15; the other path consists of a conductor, 26, connecting conductor, 22, with switch, B, and conductor, 27, connecting said switch to conductor, 25, thence to the motor. It will be clear from this wiring diagram as shown in connection with Figure 1 that as long as either of these switches is closed the motor will continue to drive the elevator, but if anything should occur to block or retard the trays on the belt, 14, to such an extent that one tray will open switch B, while another closely following tray operates switch, A, then the simultaneously open switches break the motor circuit, stopping the motor and the elevator. For example, the tray, 30, partially seen in Figure 1, may be assumed to be the cause of a blockade, so that the next following tray, 31, strikes thereagainst and becomes sufficiently retarded or arrested in such a position as to open switch B, and the next succeeding tray, 32, similarly becomes blocked, opening switch A. This causes the elevator to stop, and if it does not cease moving instantly, no harm will result as there is still room enough on belt, 14, for tray, 33, and as indicated in Figure 2 this tray may not have reached the belt, 14, when the power is shut off from the motor, 15.

Apparatus of this type is commonly used for conveying food stuffs or soiled dishes upwardly or downwardly between the dining room and the kitchen and other parts of the restaurant. It will be evident that if no safety control were provided the elevator might continue to operate and deposit trays, on the belt, 14, while the blockade would prevent the belt from shifting the trays out of registration with the elevator, and they would be piled one upon another with disastrous results to the contents of the trays, as well as probable injury to the elevator mechanism. The two co-operating switches, A and B, not only provide against this contingency, but by stopping the elevator, give notice to those at one or more loading stations that the apparatus is temporarily out of service; in fact, where the loading station comprises merely an opening in the wall, past which the flights, 11, travel, the stoppage of the elevator makes it impossible to continue loading it until the blockade has been cleared and the mechanism permitted to start operating again.

In the construction shown in Figure 3, the present invention is illustrated in connection with two horizontally travelling conveyers for transferring loads from one to another, together with an automatic system for controlling the transfer operation to avoid collision between loads of the respective conveyers, as partially disclosed in my hereinbefore referred to co-pending application. A main belt conveyer is shown at 35, and load-carrying trays are indicated thereon at 36 and 37. A transversely extending or branch belt conveyer, 38, is positioned at substantially right angles to conveyer belt, 35, and a load-carrying tray, 39, is indicated thereon. The belt, 38, is trained over a head pulley, 40, spaced away from the edge of belt, 35, by a distance preferably somewhat less than the length of a tray; the intervening gap is spanned by rollers, 41, some of which may be obliquely disposed to assist in guiding the tray, 39, in the forward direction on the main conveyer belt, 35. Obviously as the tray, 39, passes over the rollers, its forward edge will be engaged frictionally by the belt, 35, and tend to alter its direction of movement until it is drawn totally onto said belt and travels along with it. The travel of the tray over rollers, 41, may be somewhat facilitated by mounting a pair of live rollers, 42, at the inner side of the curve, which tray, 39, will traverse, so that they will engage the edge of said tray for assisting its advance. These rollers may be driven in any convenient manner, as by a belt, 43, connecting said rollers, 41, and a belt 44, operated from any convenient source.

An electric motor, 46, is provided with a pinion, 47, meshed with a gear, 48, on a shaft, 49, on which is also mounted the head pulley, 40, for driving the conveyer belt, 38. It may be understood that the belt, 35, is continuously driven by any convenient means, and the purpose of the present invention is to arrest the belt, 38, whenever trays on the conveyer, 35, beyond the intersection with said branch conveyer, become blockaded for any reason, so that the tray, 39, will not be caused to collide with trays on the belt, 35. This control system may be connected directly in the motor circuit, but for purposes of illustration is shown in conjunction with the automatic system for regulating the feeding of trays from the branch to the main conveyer. It may be understood that the current may be supplied to the motor, 46, through conductors, 51 and 52; the conductor, 51, is connected to include a pair of limit switches, C and D, to provide two paths for the current to the motor; and conductor, 52, is connected to include a limit switch E and a plurality of limit switches F, also, providing two paths for the current to the motor.

The switches, C, D, E and F are identical in construction with the switches A and B, and each switch is provided with a movable arm, 23, positioned above the belt for engagement by a tray. These switches when not engaged are normally closed. The switches C and D are positioned along belt, 35, beyond the branch conveyer, 38, and are spaced apart a distance slightly more than the length of a tray so that a single tray passing along on the conveyer belt, 35, will operate only one at a time. The two path circuit which includes switches, C and D, consists of a conductor, 53, connecting conductor, 51, to switch C and conductor, 54, connecting said switch to conductor, 55, which is directly connected to the motor, 46; and a separate circuit including a conductor, 56, connecting conductor 53 to switch D, and a conductor, 57, connecting switch D to conductor, 55. The other part of the circuit which also includes a two path current channel consists of a conductor, 59, connecting conductor, 52, to switch E, which is positioned adjacent belt, 38, and adapted to be operated by the trays conveyed thereon. A conductor, 60, connects switch E, directly to the motor, 46; the other path of the current includes a conductor, 61, connecting conductor, 59, to the group of switches, F, and a conductor, 62, connecting said switches to the conductor, 60, for completing the motor circuit.

It will be clear that when switches E and F are closed, the switches, C and D, will function in exactly the same manner as switches A and B, for stopping the belt, 38, and preventing further feeding of trays to the main conveyer, 35, in event of a blockade or jamming of the trays, to such an extent that both said switches C and D, are simultaneously opened to break the motor circuit. The switches, C and D, may be positioned at any desirable point along the conveyor, 35, forward of the branch conveyor, 38. Referring to the circuit for controlling the feeding of trays from the branch to the main conveyer, it will be seen that the opening of switch, E, by a tray will merely force the current to flow by way of switches, F, and the opening of any of switches, F, will force the current through the switch E, but if switch E and one of the switches F, are simultaneously opened, the motor circuit is broken and the conveyer, 38, will be stopped.

As the tray, 37, moves past the switches, F, it successively deflects their arms, 23, thus causing a break in this branch of the circuit at each of these switches as it passes them. If during this same interval the tray, 39, arrives in position to engage arm, 23, opening switch E, (assuming that the switches C and D are closed) it will break the other branch of the motor circuit, stopping the motor and arresting the conveyer, 38; the tray, 39, remaining on conveyer, 38, until the tray, 37, has passed beyond the last of the switches, F, at which time the motor circuit is again completed, and the tray, 37, will pass the junction point before the tray, 39, can reach it.

This method, which involves wholly stopping the belt, 38, instead of merely blocking the progress of the trays along it, has the advantage of avoiding accumulation of trays following the tray, 39, which is nearest to the transfer point and thus prevents any possible piling up or jamming of the trays on the belt, 38. The trays or load-carrying receptacles on the belt, 35, are given the right of way, and additional trays are fed onto the belt, 35, by the branch conveyer, 38, only as there is room for them, which condition is automatically regulated by the cooperating switches, E and F. Furthermore, the stopping of the belt, 38, due to jamming or a blockade, causing the opening of switches, C and D, allows a certain number of on-coming trays on the main conveyer, 35, to catch up to the blockaded trays, and perhaps to such an extent as to operate switches, F, thus, when the blockade is cleared the trays on conveyer, 38, are fed onto the main conveyer, 35, as soon as the switches, F, are freed. This control system allows a greater amount of the main conveyor to be utilized for the accumulation of the on-coming loads, in the event of a blockade forward of the branch conveyer.

In some cases it may be desirable to employ a pair of spaced belts or tapes for the conveyer, with the switches positioned with their movable arms extending upwardly between said belts in the path of the travel of trays thereon, but otherwise functioning in the same manner hereinbefore described.

It will of course be understood that the principle of my invention may be applied to a single conveyer with a pair of co-operating switches positioned so that when a blockade results to such extent as to open both switches the conveyer will be stopped until such blockade is cleared.

Figure 4 shows the internal construction of a type of limit switch which I have found satisfactory for this service, and which consists of a base block of insulation, 65, mounted in the casing, and serves as a mount for spring contact arms, 66 and 67, which are electrically connected by a pin, 68, carried on the end of lever arm, 69, which is rigidly connected to arm, 23. When the arm, 23, is swung about its fulcrum 70, the pin, 68, is withdrawn to the position indicated in dotted lines, but normally the pin is held between the spring contact arms, 66 and 67, by means of a spring, 71, reacting against the casing wall. Suitable binding screws for connecting the conductor wires to the contact arms, 66 and 67, are provided at 72 and 73, respectively.

I claim:—

1. In combination, two conveyers extending transversely of each other at a point of intersection at which load units are fed from one to the other, an electric motor for driving the feeding conveyer, two switches connected in parallel in the motor circuit and spaced longitudinally adjacent the receiving conveyer beyond the point of intersection in position to be opened by load units thereon, whereby the opening of both switches simultaneously by said loads breaks the motor circuit and arrests the feeding conveyer.

2. In combination with a vertical conveyer for carrying load units, and a horizontal conveyer positioned to receive said load units, a motor connected for driving the vertical conveyer, a control switch adjacent the horizontal conveyer in position to be opened by a load unit thereon at a point beyond that at which loads are received from the vertical conveyer, a second control switch adjacent the horizontal conveyer farther from the receiving point than the first, a feed wire for the motor and separate conductors leading from said feed wire through said switches respectively to the motor, whereby the vertical conveyer will be arrested when both switches are opened simultaneously.

3. In the combination defined in claim 2, the two switches being positioned for simultaneous engagement by adjacent load units respectively, whereby they will operate to arrest the vertical conveyer in the event of a blockade of the load units on the horizontal conveyer.

4. In combination, two conveyers extending transversely of each other at a point of intersection at which load units are fed from one conveyer to the other, an electric motor connected for driving the feeding conveyer, the control circuit for the motor including two branches, a switch connected in each branch, said switches having parts positioned in the path of travel of load units on the receiving conveyer beyond the point of intersection, whereby the blockading of loads on the receiving conveyer to such extent that said loads open both switches simultaneously breaks both branches of the motor circuit, arresting said feeding conveyer.

5. In combination, two conveyers extending transversely of each other at a point of intersection at which load units are fed from one to the other; an electric motor for driving the feeding conveyer, two switches connected in parallel in the motor circuit and spaced longitudinally adjacent the receiving conveyer beyond the point of intersection in position to be opened by load units thereon, said switches being spaced apart a distance greater than the length of a load, whereby the opening of both switches simultaneously by said loads breaks the motor circuit and arrests the feeding conveyer.

PETER OLSON.